March 19, 1968     W. J. NICKEL     3,373,573
FUEL EVAPORATION REFRIGERATION SYSTEM
Filed Jan. 31, 1967
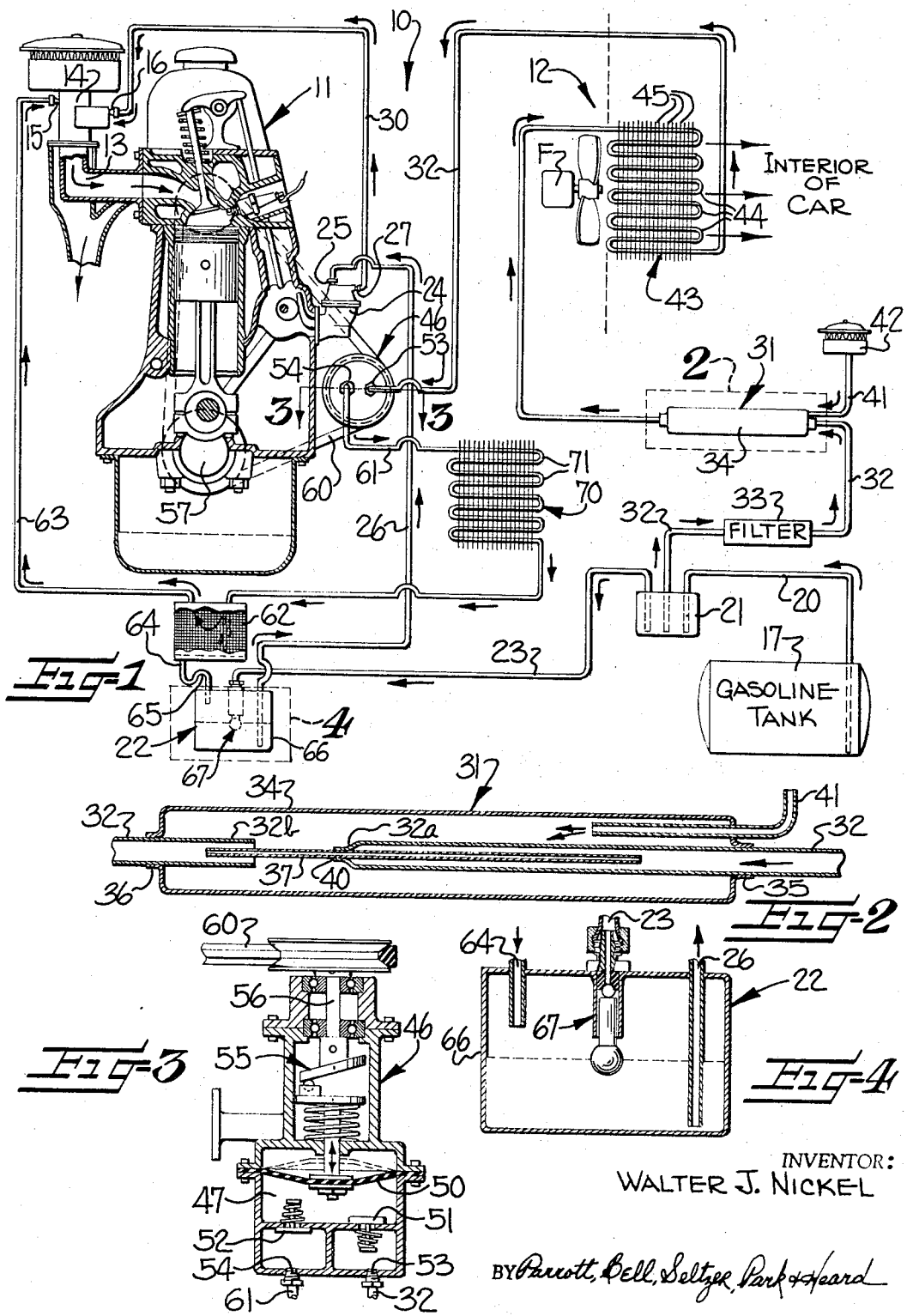
INVENTOR:
WALTER J. NICKEL
BY Parrott, Bell, Seltzer, Park & Heard
ATTORNEYS United States Patent Office 3,373,573
Patented Mar. 19, 1968

3,373,573
FUEL EVAPORATION REFRIGERATION SYSTEM
Walter J. Nickel, Charlotte, N.C., assignor to
Leola M. Nickel, Charlotte, N.C.
Filed Jan. 31, 1967, Ser. No. 612,897
7 Claims. (Cl. 62—7)

ABSTRACT OF THE DISCLOSURE

A refrigerating system comprising an internal combustion engine and a refrigeration-producing apparatus evaporating fuel from the engine supply of volatile liquid fuel for use as the refrigerant therein, and including a pump operated independently of the engine intake manifold vacuum for circulating the refrigerant through the refrigeration-producing apparatus.

---

This invention relates to a refrigeration system, and more particularly to a refrigeration-producing apparatus adapted for use as an automobile air conditioner and employing vaporized fuel from the automobile engine fuel supply as the refrigerant therein, without adversely affecting the operation of the engine.

Air conditioners currently in general use in automobile refrigeration systems are almost universally of the well-known vapor-compression type, wherein a volatile fluid refrigerant, such as Freon, is alternately compressed and permitted to expand in a closed-loop recirculating cycle, discharging heat to a heat sink when compressed, and absorbing heat from the space to be cooled when permitted to expand.

There are significant deficiencies in air conditioners of this type. The cooling they provide is low in comparison to the power they require to operate, so that they have noticeable effects on the gasoline mileage of the automobiles in which they are installed. They require heavy duty piping and fittings to contain the compressed refrigerant, and considerable insulation to preserve the cooling they achieve. They are somewhat complex in construction, and are susceptible to mechanical troubles, requiring the services of highly skilled technicians to repair. Moreover, the refrigerant they employ is expensive and sometimes not readily obtainable.

To overcome these deficiencies, another type of air conditioner has heretofore been proposed for such use, which type of air conditioner includes circulation of volatile liquid fuel from the engine fuel supply through the air conditioner for utilization as a refrigerant therein. Such air conditioners are inherently more efficient than the conventional type, producing substantial cooling with a relatively small consumption of power. They are less complex than the conventional type, and, since they do not include compression of the refrigerant, do not require the heavy duty piping and fittings of the conventional air conditioners. Moreover, since engine fuel is the refrigerant, and it is not necessarily recirculated, there is no problem of refrigerant availability or of periodic replacement thereof.

Air conditioners according to such proposals have invariably relied upon intake manifold vacuum of the engine as the source of circulation energy for the engine fuel used as refrigerant therein. This reliance has created severe problems of cross-interference between engine operation and air conditioner operation.

As is well known, intake manifold vacuum varies widely according to the load conditions encountered by the engine, and these load conditions vary considerably during even the most uneventful trip. Thus, at a given moment, there may or may not be sufficient vacuum available at the intake manifold to circulate the refrigerant and thereby operate the air conditioner. Moreover, the air conditioner will take whatever vacuum it requires so long as any is available, without regard to the air requirements of the engine. Such vacuum-robbing makes it nearly impossible to maintain an acceptable air-fuel ratio in the engine carburetor.

Because of these problems, air conditioners according to the aforementioned proposals have not met with widespread success, and to my knowledge have never been and are not presently available on the public market.

It is therefore an object of the present invention to provide a refrigeration system including a refrigeration-producing apparatus in combination with an internal combustion engine for air conditioning a confined space, such as the interior of an automobile, and employing volatile liquid fuel from the engine fuel supply as the refrigerant therein, which apparatus avoids the problems and drawbacks of prior constructions.

It is a more specific object of this invention to provide a refrigeration-producing apparatus in combination with an automobile engine for cooling air for the automobile passenger compartment, and employing fuel from the automobile engine fuel supply as a refrigerant therein, which apparatus does not interfere with the operation of the engine.

Some of the objects of the invention having been stated, other objects will appear as the description proceeds, when taken in connection with the accompanying drawings, in which—

FIGURE 1 is a schematic view of a refrigeration system according to the invention;

FIGURE 2 is an enlarged view in longitudinal section of an evaporator employed in the refrigeration system, and corresponds to the area bounded by the dotted rectangle 2 in FIGURE 1;

FIGURE 3 is an enlarged sectional view taken substantially along line 3—3 of FIGURE 1 and showing a gas pump employed in the refrigeration system; and FIGURE 4 is an enlarged view in vertical section of a surge tank employed in the refrigeration system, and corresponds to the area bounded by the dotted rectangle 4 in FIGURE 1.

The refrigeration system of the present invention includes a refrigeration-producing apparatus in combination with an internal combustion engine of a type deriving power from combustion of a volatile liquid fuel such as diesel oil, kerosene, gasoline and the like, with the refrigeration-producing apparatus employing a portion of fuel from the engine fuel supply as a refrigerant therein. The refrigerant is evaporated and circulated through the refrigeration-producing apparatus by means operating independently of the engine intake manifold vacuum, so that the thermodynamics of engine operation and those of the refrigeration-producing apparatus are essentially separate, whereby undesired interaction therebetween is avoided. Subsequent to its use as a refrigerant, the aforesaid portion of fuel is recovered and directed to the engine for eventual combustion thereby in the usual manner.

Referring now more specifically to the drawings, a refrigeration system according to the invention is generally designated at 10 in FIGURE 1 and includes a conventional internal combustion engine generally designated at 11, and a refrigeration-producing apparatus or air conditioner generally designated at 12. For convenience of description herein, the engine 11, as illustrated, is a conventional gasoline-fueled engine of a type commonly employed in automobiles, it being understood that any of the various types of engines utilizing volatile liquid fuels could be used. Since the construction of such engines is well known, a detailed description thereof is omitted herein as unnecessary.

Engine 11 includes an intake manifold 13, and means, such as a carburetor 14, is suitably connected to manifold 13 for introducing combustible mixture of air and fuel thereinto for combustion by engine 11 in the usual manner. Carburetor 14 is of conventional construction, and includes an air inlet 15 and a fuel inlet 16. Air introduced through air inlet 15 is mixed by carburetor 14 with fuel introduced thereto through fuel inlet 16 in a suitable air fuel ratio, and carburetor 14 introduces the resulting air-fuel mixture to intake manifold 13.

In order to provide fuel to carburetor 14, a fuel storage and delivery means is provided. This means includes a main fuel supply tank 17 communicating through a fuel conduit 20 with a divider tank 21, a surge tank 22 communicating with divider tank 21 through an appropriate fuel conduit 23, and means such as a conventional engine fuel pump 24, for delivering fuel from surge tank 22 to carburetor fuel inlet 16. Fuel pump 24 is provided with a fuel inlet 25, which communicates through an appropriate fuel conduit 26 with the interior of surge tank 22, and is provided with a fuel outlet 27 which communicates through an appropriate fuel conduit 30 with the fuel inlet 16 of carburetor 14.

Air conditioner 12 includes an evaporator 31 supplied with fuel from divider tank 21 through a fuel conduit 32. Preferably, and as illustrated, a cleanable filter 33 of conventional construction is interposed in fuel conduit 32 between divider tank 21 and evaporator 31, and filters out impurities which may be contained in the fuel so that clean fuel is circulated through air conditioner 12.

Evaporator 31 (FIGURE 2) comprises an elongate housing 34 which may be construced of any suitable material, such as sheet metal. Fuel conduit 32 extends into the interior of evaporator housing 34 through an inlet opening 35 provided in one end thereof, and is discontinuous therewithin, terminating in an inlet conduit end portion 32a.

Beginning at an outlet conduit end portion 32b within housing 34, which is substantially aligned with and spaced a short distance from inlet conduit end portion 32a, fuel conduit 32 exits from housing 34 through an outlet opening 36 provided in the end thereof opposite to inlet opening 35.

In order to control the rate of fuel flow in air conditioner 12, a metering means, such as a small capillary tube 37, is provided in evaporator 31, which tube 37 has a predetermined inside diameter correlated to the desired rate of fuel flow in air conditioner 12, and has an outside diameter smaller than the inside diameter of fuel conduit 32. Capillary tube 37 is disposed in substantial alignment with conduit 32, and extends across the space between the respective conduit end portions 32a, 32b, terminating at each of its ends well within the corresponding conduit end portion 32a, 32b.

Capillary tube 37 is secured to inlet conduit end portion 32a in any suitable manner, as being soldered thereto as illustrated at 40, so that fuel flow into evaporator 31 through conduit 32 can take place only through the interior of capillary tube 37.

The other end of capillary 37 extends freely into outlet conduit end portion 32b, with an open space remaining between the wall of capillary tube 37 and the adjacent wall of conduit outlet end portion 32b. The purpose of this open space will become apparent hereinafter.

Air is introduced into the interior of evaporator 31 through an air inlet conduit 41 penetrating a wall of evaporator housing 34 and communicating with the interior of evaporator 31 and with the ambient atmosphere outside thereof. An air cleaner 42 of conventional construction is preferably associated with air inlet conduit 41, and filters impurities from ambient air prior to its entry into evaporator 31.

Means presently to be described induces air to flow into evaporator 31 through the air conduit 41 and subsequently outwardly of the evaporator 31 through outlet end portion 32b of fuel conduit 32. This air flow draws fuel into evaporator 31 through capillary tube 37 by aspiration, causing the fuel so drawn to evaporate in the open space between capillary tube 37 and conduit end portion 32b.

Such evaporation produces a refrigerant mixture of air and evaporated fuel, which mixture is of a temperature significantly below that of the ambient air because evaporation of the fuel absorbs significant quantities of heat from the air. The resulting chilled refrigerant mixture of evaporated fuel exits from evaporator 31 through end portion 32b of fuel conduit 32, and is delivered by conduit 32 to a heat exchanger 43.

Heat exchanger 43 may be of any suitable construction. Preferably, and as illustrated, it comprises a plurality of cooling coils 44 formed in conduit 32, which coils 44 preferably are equipped with a plurality of radiation fins such as those shown schematically at 45. The chilled refrigerant mixture circulates through heat exchanger 43 within the coils 44. Warm air from the automobile passenger compartment, or other thermal load to be cooled, is passed over the coils 44 by suitable means, such as fan F, and in heat transferring relation to the chilled refrigerant mixture within the coils, cooling the thermal load in well understood manner.

Means, such as a gas pump 46 (FIGURE 3), is provided for circulating air and fuel through air conditioner 12. Pump 46 is of a type adapted to pump gaseous fluids, and is driven independently of the intake manifold vacuum produced by the engine 11. Preferably, and as illustrated, pump 46 is a conventional diaphragm-type pump, and as such includes a diaphragm chamber 47 having a movable diaphragm 50 disposed therewithin.

Diaphragm chamber 47 alternately communicates, through suitable check valves such as conventional spring-biased check valves 51 and 52, with a pump inlet 53 and a pump outlet 54. Diaphragm 50 is moved back and forth, as indicated by the arrow in FIGURE 3, between the full line and solid line positions in FIGURE 3 by suitable means, such as cam and cam follower arrangement 55. A suitably driven cam shaft 56 supplies impetus for this motion. Preferably, and as illustrated, cam shaft 56 is driven from engine crank shaft 57 through a suitable belt and pulley arrangement 60. When so moved, diaphragm 50 alternately produces a negative pressure, or suction, and a positive pressure within diaphragm chamber 47.

Check valve 51 is arranged to permit communication between chamber 47 and pump inlet 53 when a suction is present within chamber 47, and to block such communication when a positive pressure is present therewithin. Conversely, check valve 52 is arranged to block communication between diaphragm chamber 47 and pump outlet 54 when a suction is present within chamber 47 and to permit such communication with a positive pressure is present therewithin.

Fuel conduit 32 is connected with pump inlet 53, and communicates with diaphragm chamber 47 under control of check valve 51. Accordingly, the suction phase of the operating cycle of pump 46 is communicated to fuel conduit 32, causing the aforesaid refrigerant mixture to circulate through evaporator 31 and heat exchanger 43, and to be drawn into diaphragm chamber 47. Similarly, an outlet conduit 61 is connected with pump outlet 54 and communicates with diaphragm chamber 47 under control of check valve 52, so that the positive pressure phase of the operating cycle of pump 46 is communicated to outlet conduit 61.

Outlet conduit 61 communicates with an air and liquid separator means 62, and refrigerant mixture drawn into pump 46 through pump inlet 53 is subsequently discharged therefrom through pump outlet 54 and outlet conduit 61 to separator 62.

Separator 62 is of conventional construction, and serves to separate the refrigerant mixture into separate liquid and gas fluid components. The gas fluid, or air, component, now substantially free of fuel evaporated therein, is delivered from separator 62 through an air conduit 63 to the air inlet 15 of carburetor 14, where it mixes with ambient air drawn into the carburetor by the engine intake manifold vacuum in the usual manner. Accordingly, any fuel which may remain in the air component of the mixture because of incomplete separation in separator 62 will not be wasted, but will be recovered by carburetor 14 and introduced thereby to engine 11 for combustion therein.

The liquid fuel component separated from the refrigerant mixture by separator 62 flows by gravity through a fuel recovery conduit 64 into surge tank 22, where it is collected for subsequent supply to engine 11 by engine fuel pump 24. Conduit 64 is provided with a conventional U-trap 65, which functions in the usual manner to provide a liquid seal between the interior of surge tank 22 and the interior of air and liquid separator 62.

Surge tank 22 (FIGURE 4) includes a fuel container 66 adapted to contain a predetermined level of liquid fuel therein for supply to engine fuel pump 24 on demand. Fuel conduit 64 empties into container 66, terminating a short distance above the normal fuel level therein (shown in dotted lines in FIGURE 4), so that the fuel flowing from conduit 64 is added to fuel already within surge tank 22, supplied thereto from divider tank 21 through fuel conduit 23.

The fuel level within surge tank 22 is controlled by controlling the flow of fuel thereinto from divider tank 21. To this end, suitable means, such as a float valve 67 of conventional construction, is provided in surge tank 22, operatively related with fuel conduit 23 to control fuel flow therethrough into surge tank 22 in accordance with the fuel level therewithin.

The apparatus thus far described is fully capable of producing refrigeration for cooling a thermal load by utilizing the heat of evaporation of engine fuel. However, it is to be noted that in the usual instance, air delivered through air conduit 63 to the air inlet 15 of carburetor 14 is likely to be somewhat cooler than the ambient air.

In order to avoid possible difficulties with the air-fuel ratio of the combustible mixture introduced by carburetor 14 to intake manifold 13, and to minimize icing of the carburetor throttle plate (not shown), it is preferable to warm the air in air conduit 63 prior to introducing it to the carburetor air inlet 15. To this end, an additional heat exchanger may be provided at a convenient point in the system subsequent to the cooling of the thermal load. Such a heat exchanger is shown at 70, interposed in the conduit 61 between gas pump 46 and separator 62.

Heat exchanger 70 is similar to heat exchanger 43, and includes a plurality of coils 71 formed in outlet conduit 61. The still-cool refrigerant mixture circulates through coils 71, while air from the ambient atmosphere, of a temperature higher than that of the refrigerant mixture, passes over coils 71 in heat exchanging relation therewith. Accordingly, the refrigerant mixture is warmed during its passage through the heat exchanger 70 by absorbing heat from the ambient air, in well understood manner. Therefore, the air component of the refrigerant mixture, when introduced to air inlet 15 of carburetor 14, has been warmed by passage through heat exchanger 70 to a temperature considerably above that of the chilled refrigerant mixture, and air-fuel ratio problems as well as throttle plate icing problems are accordingly avoided.

In operation, gas pump 46 provides a suction in conduit 32. This suction induces a flow of air into air conditioner 12 through the air conduit 41 in evaporator 31. The air thus induced to flow in conduit 32 passes by the end of capillary tube 37 within the evaporator 31, and aspirates fuel from divider tank 21, with the quantity thereof being metered in accordance with the size of the inside diameter of capillary tube 37. Because of this aspiration, the fuel evaporates in the air, and the resulting refrigerant mixture of air and fuel is chilled as a result of the evaporation. The chilled refrigerant mixture then flows through heat exchanger 43, cooling the thermal load passed therethrough as hereinabove described.

From heat exchanger 43, the chilled refrigerant mixture continues to circulate through air conditioner 12, being drawn through inlet 53 of gas pump 46 into diaphragm chamber 47 thereof, and then forced outwardly thereof through pump outlet 54 into outlet conduit 61 under positive pressure. While passing through conduit 61, the still-cool refrigerant mixture is circulated through heat exchanger 70, being warmed thereby as described above. Subsequently, separator 62 separates the refrigerant mixture into a liquid fluid, or fuel, component and a gas fluid, or air, component, with the fuel component being delivered to surge tank 22 through conduit 64, and the air component being delivered through air conduit 63 to the air intake 15 of carburetor 14.

It will thus be seen that I have provided a refrigeration-producing apparatus adapted for use with an internal combustion engine for cooling a thermal load, and employing fuel from the engine fuel supply as a refrigerant in such a manner as to avoid cross-interference between operation of the engine and operation of the air conditioner.

In the drawings and specification there has been set forth a preferred embodiment of the invention and, although specific terms are employed, they are used in a generic and descriptive sense only and not for purposes of limitation, the scope of the invention being defined in the claims.

I claim:

1. The combination with an internal combustion engine of the type utilizing a volatile liquid fuel including an intake manifold, a carburetor connected to the intake manifold and having an air inlet, and a fuel storage and delivery means for delivering liquid fuel to the carburetor for combustion by the engine, of a refrigeration-producing apparatus comprising:
    a gas pump separate from the intake manifold of said engine and having an inlet and an outlet and adapted to be driven for pumping gaseous fluids,
    evaporator means operatively communicating with the fuel storage and delivery means, the ambient atmosphere and said gas pump inlet for producing a refrigerant mixture of fuel and air drawn thereinto and therethrough by said gas pump,
    heat exchanger means operatively communicating with and interposed between said gas pump inlet and said evaporator for the flow of refrigerant mixture therethrough and for the exchange of heat with a thermal load, and
    separator means operatively communicating with said gas pump outlet for receiving refrigerant mixture therefrom and for separating the same into liquid and gas fluid components, said separator means directing separated liquid to the fuel storage and delivery means for delivery to the carburetor and directing separated gas to the carburetor air inlet.

2. The combination according to claim 1 wherein said gas pump is operatively connected to and driven from the engine.

3. The combination according to claim 1, wherein said gas pump includes a diaphragm chamber, a diaphragm disposed therewithin, means for moving said diaphragm relative to said chamber to alternately produce suction and positive pressure within said chamber, means for communicating said gas pump inlet with said chamber when under suction, and means for communicating said chamber with said gas pump outlet when under positive pressure.

4. The combination according to claim 1, wherein said fuel storage and delivery means includes
    a main fuel supply tank,
    a divider tank operatively communicating with and interposed between the main fuel supply tank and said evaporator means for the flow of liquid fuel therethrough, a surge tank operatively communicating with and being interposed between said separator means and the carburetor for the flow of liquid fuel therethrough, and conduit means connecting said divider and surge tanks for assuring delivery of a sufficient flow of liquid fuel to the carburetor.

5. The combination according to claim 1, further comprising:

second heat exchanger means disposed in heat exchanging relationship with the ambient atmosphere and operatively communicating with and interposed between said gas pump and the carburetor air inlet for warming the gas fluid component of said refrigerant mixture prior to direction thereof to said carburetor air inlet.

6. The combination according to claim 1, wherein said evaporator means includes metering means for controlling the rate of flow of liquid fuel thereinto.

7. The combination according to claim 6, wherein said metering means comprises a capillary tube having a predetermined inside diameter correlated with the desired rate of flow of liquid fuel into said evaporator.

References Cited

UNITED STATES PATENTS 2,227,927    1/1941    Downs _____ 62—7

WILLIAM J. WYE, *Primary Examiner.*